(12) United States Patent
Kausler et al.

(10) Patent No.: US 11,215,485 B2
(45) Date of Patent: Jan. 4, 2022

(54) METHOD, DEVICE AND COMPUTER PROGRAM FOR ASCERTAINING AN ANOMALY

(71) Applicant: Robert Bosch GmbH, Stuttgart (DE)

(72) Inventors: Bernhard Kausler, Heidelberg (DE); Laura Beggel, Stuttgart (DE); Martin Schiegg, Korntal-Muenchingen (DE); Michael Pfeiffer, Boeblingen (DE)

(73) Assignee: Robert Bosch GmbH, Stuttgart (DE)

( * ) Notice: Subject to any disclaimer, the term of this patent is extended or adjusted under 35 U.S.C. 154(b) by 515 days.

(21) Appl. No.: 16/183,807

(22) Filed: Nov. 8, 2018

(65) Prior Publication Data

US 2019/0154474 A1  May 23, 2019

(30) Foreign Application Priority Data

Nov. 23, 2017 (DE) .......................... 102017220954.2

(51) Int. Cl.
| | |
|---|---|
| *G01D 18/00* | (2006.01) |
| *G01D 3/08* | (2006.01) |
| *G06N 20/00* | (2019.01) |
| *G06F 17/18* | (2006.01) |
| *G01S 7/497* | (2006.01) |
| *G01S 7/52* | (2006.01) |
| *G06N 5/04* | (2006.01) |
| *G01S 7/40* | (2006.01) |

(52) U.S. Cl.
CPC .............. *G01D 18/00* (2013.01); *G01D 3/08* (2013.01); *G01S 7/40* (2013.01); *G01S 7/497* (2013.01); *G01S 7/52004* (2013.01); *G06F 17/18* (2013.01); *G06N 5/045* (2013.01); *G06N 20/00* (2019.01)

(58) Field of Classification Search
CPC .. G01D 18/00; G01D 3/08; G01S 7/40; G01S 7/497; G01S 7/52004; G06F 17/18; G06N 20/00; G06N 5/045
See application file for complete search history.

(56) References Cited

U.S. PATENT DOCUMENTS

2016/0217379 A1\*  7/2016  Patri ...................... G06N 20/00
2018/0247239 A1\*  8/2018  Horrell ................. G06F 11/008

OTHER PUBLICATIONS

"Learning Time-Series Shapelets", by Grabocka et al. (Year: 2014).\*
(Continued)

*Primary Examiner* — Roy Y Yi
*Assistant Examiner* — Geoffrey T Evans
(74) *Attorney, Agent, or Firm* — Norton Rose Fulbright US LLP; Gerard Messina (57) ABSTRACT

A method for ascertaining whether a series of sensor values contains an anomaly, including the following steps: providing a shapelet and at least one training data series; measuring in each case a distance between the shapelet and the training data series at a plurality of different predefinable positions of the training data series; ascertaining at least one minimal distance from the measured distances and ascertaining at least one change variable for at least one predefinable data point of the shapelet the change variable being ascertained as a function of at least one of the measured distances. A computer program, a device for carrying out the method, and a machine-readable memory element, on which the computer program is stored are also provided.

21 Claims, 4 Drawing Sheets

(56) References Cited

OTHER PUBLICATIONS

"Time series anomaly detection based on shapelet learning"; by Beggel et al.; Published: Jul. 16, 2018; Computational Statistics vol. 34, pp. 945-976 (2019) (Year: 2018).*

Garbocka J. et al., "Scaleable Discovery Time-Series Shapelets", arXiv preprint arXiv:1503.03238, Mar. 2015.

* cited by examiner

METHOD, DEVICE AND COMPUTER PROGRAM FOR ASCERTAINING AN ANOMALY

CROSS REFERENCE

The present application claims the benefit under 35 U.S.C. § 119 of German Patent Application No. DE 102017220954.2 filed on Nov. 23, 2017, which is expressly incorporated herein by reference in its entirety.

FIELD

The present invention relates to a method for ascertaining an anomaly in a data series. The present invention also relates to a computer program and to a device, each of which is configured to carry out the method.

BACKGROUND INFORMATION

An anomaly, which characterizes a deviation of a data series from an assumed normal pattern of the data series, in particular, within a section of the data series, is to be detected in an automated manner. This means that a method and/or a device is or are able to detect anomalies in a data series in an automated manner, for which purpose at least one expert is normally required. The expert recognizes anomalies in data series as a result of his or her expert knowledge.

It is possible to use, for example a so-called shapelet for classifying data series such as, for example, in "Scaleable Discovery Time-Series Shapelets", arXiv preprint arXiv: 1503.03238, Josif Garbocka, Martin Wistuba, Lars Schmidt-Thieme.

SUMMARY

A method in accordance with an example embodiment of the present invention may have the advantage over the related art that a shapelet may be ascertained with unlabeled data series that may also contain anomalies. The method may also be used in order to detect anomalies, for which shapelets have not been previously used. This results in a great advantage of this method that the previous difficulty of providing sufficiently large data sets from training data series for ascertaining a shapelet is overcome, the training data series containing no anomalies or having at least to be labeled. Another advantage is that a high generalization of the data series without anomalies may be learned with the aid of this method, even if there are few training data series available for ascertaining the shapelet. This is because this method has the advantageous property that the shapelets may also be simultaneously ascertained as a function of multiple different data series.

SUMMARY

In a first aspect, the present invention relates to a method for ascertaining whether a series of sensor values contains an anomaly. The method includes, e.g., the following steps:
providing a shapelet and at least one training data series, measuring in each case a distance between the shapelet and the training data series at a plurality of different predefinable positions of the training data series, ascertaining at least one minimal distance from the measured distances,
ascertaining at least one change variable for at least one predefinable data point of the shapelet. The change variable is ascertained as a function of at least one of the measured distances.

A shapelet may be understood below to mean a series of data points. These data points are each assigned at least one predefinable value and at least one position in a predefinable sampling grid. In addition, "at a plurality of different predefinable positions" may be understood to mean that a position in a predefinable sampling grid of the training data series is selected and a section of the data series, in particular, the series of sensor values, is used at this position, in order to measure the distance between the shapelet and the section of the data series. This is carried out for a plurality of positions. The data points of the training data series are each also assigned to a position on a sampling grid of the training data series.

A sensor value may be a measured or a virtually ascertained sensor value. A virtually ascertained sensor value may be determined with the aid of a model. The distance is a variable that characterizes a deviation between the shapelet and a selected section of the training data series.

The advantage of this method is that a pointwise change of the shapelet may be achieved and thus, the shapelet may be trained specifically for the task of detecting an anomaly.

It is particularly advantageous if an ascertainment of a decision variable takes place after the ascertainment of the minimum distance. The decision variable is ascertained in such a way that the minimum distance is smaller than the decision variable plus a predefinable tolerance variable. One consequence of the steps is that the tolerance variable characterizes an admissible exceedance of the distance beyond the decision variable. This offers the advantage that the decision variable may be designed preferably small with the aid of the tolerance variable, but that outliers may still be taken into consideration without coming to a false conclusion during a check for an anomaly of the data series, in particular, of the series of sensor values.

It is further advantageous if the change variable is also ascertained as a function of the decision variable and of the tolerance variable. This has the advantage that additional measured distances may be used for ascertaining the change variable. The method may thus also be made more robust against falsely ascertained decision variables, since the measured distances that are greater than the decision variable may nevertheless be taken into consideration for ascertaining the decision variable with the aid of the tolerance variable.

In one particularly advantageous refinement of the method, the change variable is ascertained with the aid of a gradient descent method with respect to the predefinable data point of the shapelet.

A use of the gradient descent method with respect to a data point means that the gradient method is used in order to specifically determine a more suitable value of this data point, in particular, by determining a derivation of a cost function according to the predefinable data point of the shapelet, optionally also according to the decision variable. The gradient descent method may contribute to a time-efficient and computationally efficient ascertainment of the shapelet.

In one alternative or additional refinement of the method, the change variable is ascertained as a function of at least one gradient of the gradient descent method. In addition, a cost function is minimized with the aid of an adaptation of the predefinable data point of the shapelet as a function of the change variable.

In the gradient descent method, a gradient may be determined and the change variable may be ascertained as a function of this gradient for adapting the shapelet.

The cost function may be a function, which characterizes the distances between the shapelet and the training data series as a function of the shapelet, in particular, of the values of the data points of the shapelet, and of the decision variable, optionally also of the tolerance variable. A minimization of the cost function means that the distance between the shapelet and the training data series becomes smaller, in particular, the distance between the shapelet and a characteristic detail of a data series with no anomaly.

It is particularly advantageous if at least the gradient and at least one subgradient are ascertained with the aid of the gradient descent method, and the gradient is ascertained as a function of at least one of the measured distances used for ascertaining the change variable. The subgradient is ascertained as a function of the tolerance variable. The change variable is ascertained as a function of at least the ascertained subgradient or subgradients. A subgradient may be understood to mean an approximated gradient. This subgradient may be approximated at a position to be evaluated with the aid of a weighted superimposition of the gradients at adjacent positions of the position to be evaluated.

This yields the advantage that superior convergence properties are provided for ascertaining the shapelet with the aid of the tolerance variable and, thus, by the subgradient, because the tolerance variable also allows additional measured distances to be taken into consideration for ascertaining the shapelet.

In one refinement of the method, the minimum distance in the tolerance variable is considered a penalty variable if the minimum distance is greater than the decision variable. The penalty variable is a function of the exceedance of the minimum distance beyond the decision variable.

It is advantageous if the change variable is ascertained as a function of a weighted summation of a plurality of the measured distances. It is also particularly advantageous if the gradient and the subgradient are each ascertained as a function of the weighted summed distances. This has the advantage that more precise gradients may be ascertained by the weighted summation of the measured distances, since more distances therefore have more information available in order to determine the gradients.

In one alternative refinement of the method, the predefinable data point of the shapelet is adapted as a function of the change variable after the change variable is ascertained. The steps of measuring a plurality of distances and of adapting the decision variable and of ascertaining at least one adaptation variable and the step of adapting the predefinable data point of the shapelet are carried out multiple times in succession. The step of measuring a plurality of distances is carried out each time with the aid of the adapted shapelet, the adapted shapelet having been adapted, in particular, in the previous step of adapting the data point of the shapelet as a function of the change variable.

The advantage of this refinement is that the shapelet is more specifically ascertained and a more robust method for ascertaining the shapelet may be achieved. This is because the shapelet may be ascertained within the newly adapted decision variable, as a result of which, for example, a local minimum of the cost function may be overcome once the decision variable has been adapted. The shapelet may be ascertained specifically for the adapted decision variable. The repeated adaptation of the decision variable may be understood as a secondary condition for ascertaining the shapelet, which results in the measured minimal distances being adapted in the direction of the reference point of the decision variable. This means that the minimum distance may approach the ideal or the desired minimum distance and the shapelet may be adapted as suitable not only for the training data, but also suitable for the instantaneously used decision variable.

A plurality of different training data series is advantageously provided and when measuring the distances, in each case, a plurality of distances between the shapelet to one each of the training data series is measured at different predefinable points of the respective training data series. In each case, at least one minimum distance of the plurality of measured distances of every training data series is subsequently ascertained. The decision variable is adapted in such a way that each of the ascertained minimum distances is smaller than the decision variable plus the tolerance variable. In addition, at least one change variable for at least one predefinable data point of the shapelet is ascertained in each case for each of the training data series and the predefinable data point of the shapelet is adapted as a function of an averaging of the ascertained change variables.

The advantage according to the steps of this method is that the method is also compatible with different training data series, which are not characterized as to whether each of these exhibits at least one anomaly. This means that the method requires no labeled training data, as a result of which no expensive labeling for extracting the shapelet need be carried out by experts, but also that no expert knowledge is required for extracting the shapelet, since this method is able to ascertain the shapelets independently. Furthermore, a predefinable number of training data series may exhibit at least one anomaly and, in spite of this, the method may be used with these training data series in order to ascertain the shapelet.

An additional advantage is that according to this method, not only is a shape of a shapelet contained in the data series ascertained, but also better suited shapelets may be found, because the shapelet is adapted via the different training data series.

In one advantageous refinement of the method, the decision variable is adapted in such a way that a predefinable number of minimal distances is, in each case, greater than the decision variable. As a result, the training data series having anomalies may be taken into consideration when ascertaining the shapelet, so that the shapelet is not adapted for the training data series having at least one anomaly. The predefinable number of minimal distances, which is greater than the decision variable, may be selected to be smaller or the same as an assumed number of training data series having at least one anomaly.

In one particularly advantageous refinement of the method, the subgradient is ascertained only as a function of those minimum distances that are greater than the decision variable. This yields the advantage that distances, which are also greater than the decision variable and, accordingly, the associated shapelet for ascertaining this distance, which is less suitable, are still taken into consideration for ascertaining a suitable shapelet.

As a result, apparently unsuitable shapelets may also result in an ideal shapelet being ascertained with the aid of the less suitable shapelets. Another advantage is that regardless of the initialization of the provided shapelet, this shapelet may still be adapted to form a suitable shapelet even despite the initially unsuitable shape. In addition, the training data series having anomalies may be taken into consideration in the adaptation of the shapelet with the aid of the tolerance variable, so that these training data series are taken less into consideration in the ascertainment of the shapelet and do not negatively impact the ascertainment of a suitable shapelet.

In one refinement of the method, the tolerance variable, in addition, is also adapted during adaptation of the decision variable.

It is particularly advantageous, if it is decided as a function of the decision variable whether or not an anomaly is present and as a function of whether or not it has been decided that an anomaly is present, that an actuator is activated.

The actuator may be a part of an at least semi-autonomous machine. The actuator may be used to output a visual, acoustic and/or haptic signal or to activate another device, in order to trigger or carry out an action of the at least semi-autonomous machine in response to the detected anomaly. Fields of application may, for example, be medical technology in order, for example, to monitor EKG signals or the heart beat/heart sounds for anomalies (for example, cardiac arrhythmia), but also, for example, to monitor measured sounds for anomalies during engine ignitions.

If a change of sound or of another physically measurable property occurs, an anomaly may be detected with the aid of this method. In addition, the method may be used for monitoring a production operation sequence. As soon as an anomaly has been detected, a protection function (for example, an emergency shutdown or a regulation of a torque) may be started in order to prevent damage, for example.

The method may further be used to monitor electrical signals, in order, for example, to monitor the power supply of electric machines or a system made up of an electric machine and its energy sources or the communication between the electric machine and the energy source, in order to then start the protection function.

Another use of the method may, for example, be in quality control. In this case, for example, acoustic or visual signals, in particular, ultrasonic signals, which are used to check a workpiece by being directed at the workpiece, are registered. Based on these registered signals, defective workpieces may then be identified with the aid of one of the aforementioned methods by then, and precisely then, deciding that a workpiece is defective if it has been decided that the registered signals for checking an anomaly exhibit an anomaly. These workpieces thus identified may then be rejected in an automated manner.

In addition, it may be decided with the aid of one of the aforementioned methods whether an anomaly is present in a detected echo of emitted electromagnetic or acoustic signals, in order, for example, to monitor the surroundings of a motor vehicle. In this case, it may be provided that electromagnetic signals or acoustic signals are emitted with the aid of an emitter of the electromagnetic signals or acoustic signals mounted, for example, in the motor vehicle. An echo of these emitted signals may then be detected. If it has been decided that an anomaly is present in a detected echo, a warning system or a control system may be activated accordingly (for example, a warning signal may be output or the control system may be transferred into a secured mode.

In another aspect, the present invention relates to a computer program, which is configured to carry out one of the previously cited methods, i.e., includes instructions which prompt a computer to carry out one of the aforementioned methods, including all its steps, if the computer program runs on the computer. The present invention further relates to a machine-readable memory module, on which the computer program is stored and a device, in particular, the computer, which is configured to carry out one of the aforementioned methods.

In another aspect, the present invention relates to a device, which is configured to carry out each step of one of the methods.

Exemplary embodiments of the present invention are depicted in the figures and explained in greater detail below.

DETAILED DESCRIPTION OF EXAMPLE EMBODIMENTS

Figure 1:
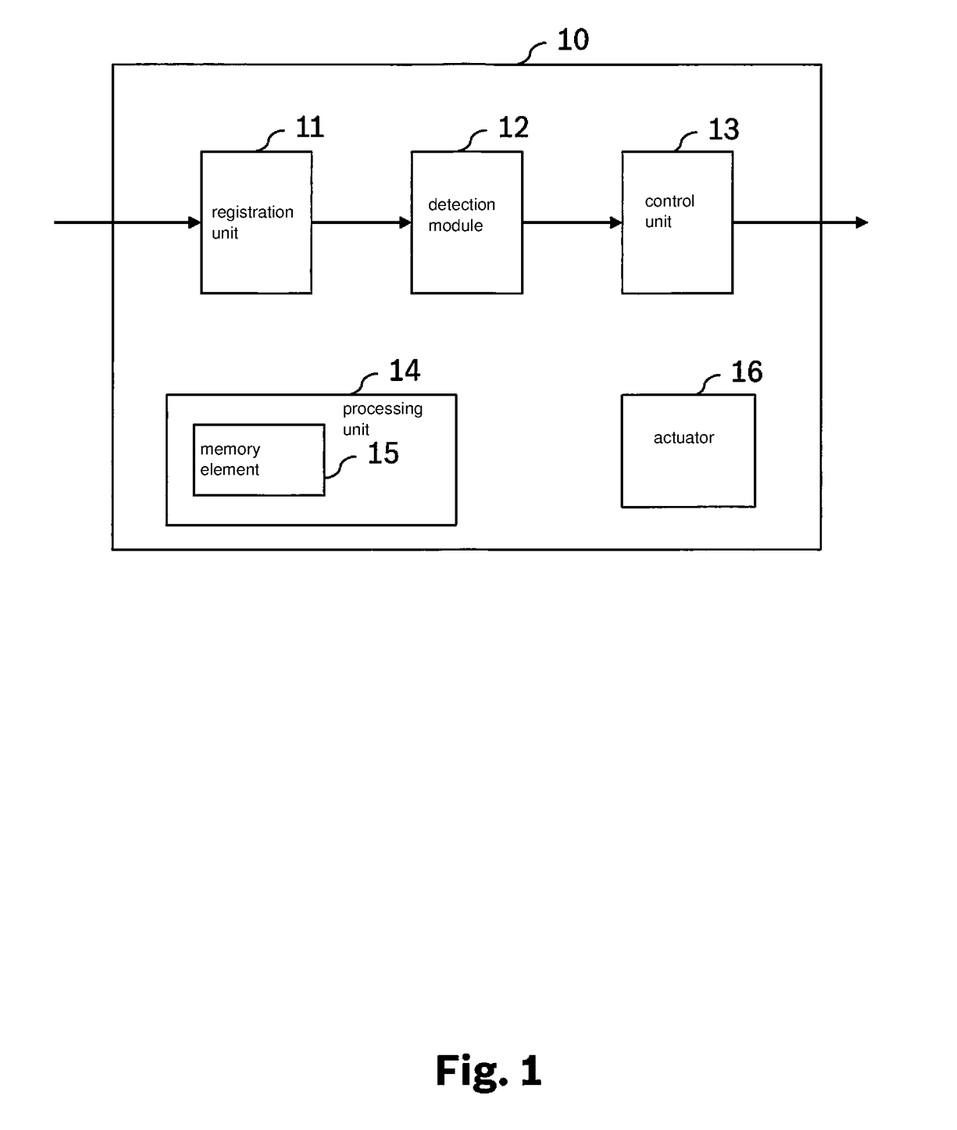
FIG. 1 schematically shows a depiction of a system for detecting an anomaly.

FIG. 1 schematically shows a depiction of one specific embodiment of a system 10 for detecting an anomaly in an input variable, in particular, in a series of sensor values, of system 10. System 10 includes a registration unit 11, a detection unit 12 and a control unit 13. The input variable of system 10 is registered with the aid of registration unit 11 and forwarded to detection module 12. Detection module 12 is configured to detect an anomaly in the input variable. As a function of the detected anomaly, a control variable may optionally be generated with the aid of control unit 13, which may be used for controlling an actuator 16, which is installed, for example, in an at least semi-autonomous machine, in particular, a vehicle or a robot. Actuator 16 is preferably a warning system, which outputs a warning signal when an anomaly occurs. System 10 may further include a processing unit 14 and a memory element 15.

Figure 2A:
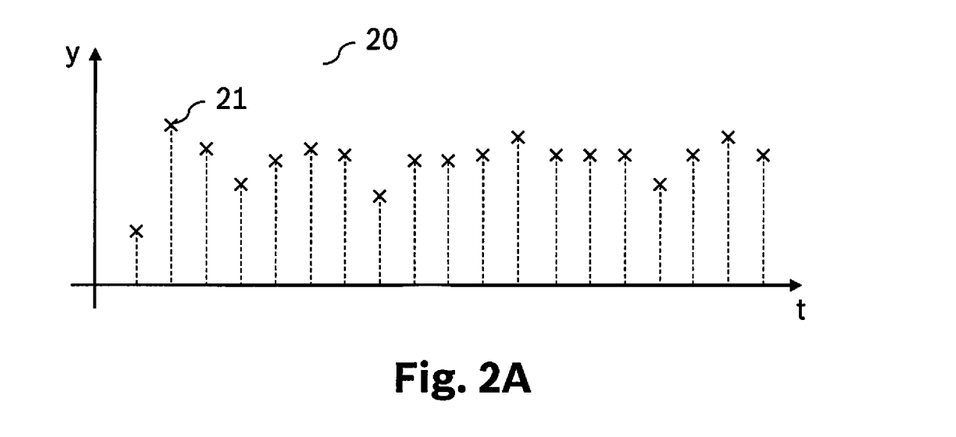
FIG. 2A schematically shows a depiction of a data series.

FIG. 2A schematically shows a depiction of a data series 20. Data series 20 includes a plurality of data points 21. Data points 21 are each assigned to a position on an axis t and characterized by a value y. Data series 20 is preferably a data series, which includes one-dimensional data points and real data points. One-dimensional is understood to mean that each data point 21 is characterized based exclusively on a value y. Alternatively, data series 20 may include a plurality of multi-dimensional data points 21. In this case, every data point 21 may be assigned a plurality of real values y. Alternatively, the data series may also include complex data points 21. Data points 21 are preferably sensor values, which have been registered with the aid of registration unit 11. Alternatively, the sensor values may also be ascertained virtual values, which have been calculated based, for example, on a model. In one alternative specific embodiment, data points 21 of data series 20 are not situated equidistant to one another, i.e., adjacent data points 21 are spaced differently relative to one another.

Figure 2B:
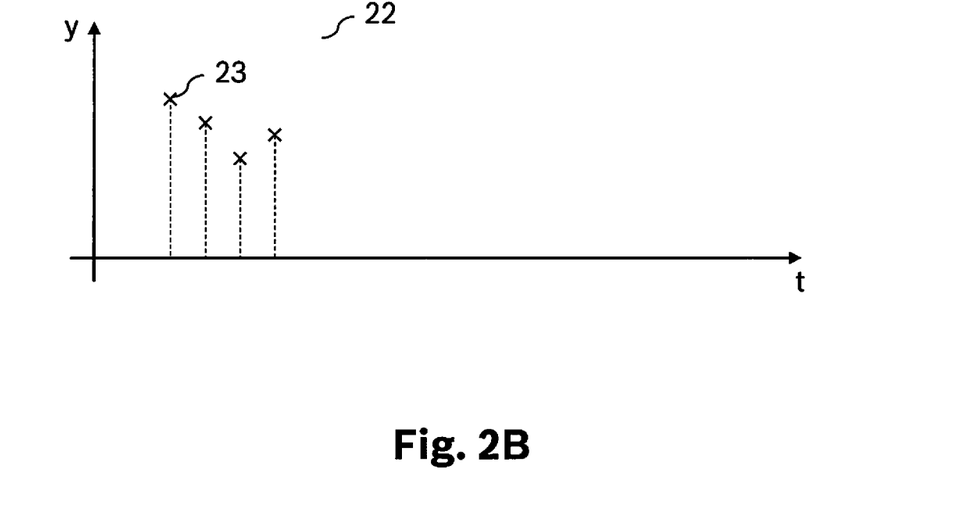
FIG. 2B schematically shows a depiction of a shapelet.

The exemplary embodiment of a data series according to FIG. 2B is not limited to data series, in which the data points are situated along a single axis t. It is also possible for data points to be situated along multiple axes, in particular, if the data series contains an image for example. Anomalies in this case may then be ascertained along a particular axis, or also for sections on multiple axes, for example, in image details.

Alternatively, the data series may be divided into arbitrary sections, one section each of the data series being checked for an anomaly.

An anomaly in data series 20 may be detected with the aid of system 10. For example, a reference model, which characterizes a normal state or a normal pattern of data series 20, is stored in system 10, in particular, in detection module 12. System 10 is able to detect an anomaly in data series 20 based on this stored reference model. An anomaly is understood below to mean a deviation of a plurality of data points of a data series from an expected sequence of these data points. The reference model below includes at least one so-called shapelet, in order to detect an anomaly in data series 20 or in a detail of this data series 20.

FIG. 2B schematically shows an exemplary shapelet 22, which may be used to detect an anomaly in data series 20. This shapelet 22 includes a predefinable sequence of data points 23, this predefinable sequence of data points 23 being shorter than that of data series 20. Data points 23 of shapelet 20 are each characterized based on a value y and each data point 23 is assigned a position on an axis t. The dimensionality of shapelet 22 preferably coincides with the dimensionality of the data series to be examined and/or to the distances between individual data points 21, 23, so that every data point 23 of the shapelet may be assigned a data point 21 from a selected section of the data series. Shapelet 22 is preferably parameterizable, the number of data points 23, the distance between these data points and the values of the data points being parameterizable. Whenever a multi-dimensional data series 20 is to be examined, the shapelet must accordingly be multi-dimensionally structured for such purpose.

In one specific embodiment of shapelet 22 according to FIG. 2B for ascertaining an anomaly, each data point 23 of shapelet 22 is assigned a data point 21 of data series 20 within a predefinable section of data series 20 having a length identical to that of shapelet 22. Data points 23 of shapelet 22 immediately following one another are each preferably assigned data points 21 immediately following one another of the predefinable section of data series 20. For example, data point 23 of shapelet 22 is assigned data point 21 of data series 20 and the immediately following data point of data series 23 of shapelet 22 is assigned immediately following data point 21 of data series 20, etc. Optionally, the distances between two positions of the data points of the data series and of the shapelet are equal.

In one alternative specific embodiment, each data point 23 of shapelet 22 is assigned at least one data point 21 of data series 20 in a predefinable section of data series 20, and immediately following data points 23 of shapelet 22 are each not necessarily assigned immediately following data points 21 of data series 20. For example, first data point 23 of shapelet 22 is assigned data point 21 of a selected section of data series 20. The immediately following data point of data point 23 of shapelet 22 in this specific embodiment, for example, is assigned the next data point but one of data point 21 from the section of the data series. This means, in this specific embodiment, the immediately following data points of shapelet 22 are assigned only every other data point but one of the immediately following data points of data series 20, and not all immediately following data points of data series 20 are taken into consideration.

Shapelet 22 preferably includes a characteristic of a data series with no anomaly, i.e., for example, a piece of information about a pattern of a normal data series is coded in the form of shapelet 22. Based on shapelet 22, it is therefore possible to ascertain a deviation in data series 20 from a normal data series in order to detect an anomaly. Optionally, the positions of the anomalies and the type of anomaly may also be identified based on shapelet 22 after an anomaly has been detected, for example, at which position the deviation occurred.

In addition, it is possible that it may be ascertained whether the data series contains multiple anomalies, for example, as a function of the distribution of the deviation of shapelet 22 relative to data series 20.

If multiple different shapelets are used, these may exhibit lengths different from one another.

The following describes how an anomaly may be detected with the aid of a predefined shapelet. It has been assumed that the predefined shapelet already has a characteristic shape, which characterizes a data series with no anomaly. The creation of such a shapelet is described below.

In the first step, individual distances between the shapelet and different sections of the data series are ascertained with the aid of a shapelet transformation. In this exemplary embodiment, the shapelet transformation is preferably carried out using the following equation:

$$D_{i,j,k} = \frac{1}{L}\sum_{l=1}^{L}(T_{i,(j+l-1)} - S_{k,l})^2 \quad \text{(Equation 1)}$$

$T_{i,j}$ being a value of a data point from the section $[T_{i,j}, \ldots, T_{i,(j+L-1)}]$ of the data series and $D_{i,j,k}$ characterizing the distance between the k-th shapelet, of a total K different shapelets, at the j-th position of the i-th data series having the length L of the shapelet at data point $S_{k,L}$ of the shapelet.

The section of the training data series preferably includes at least just as many data points as the shapelet, but may include more data points than the shapelet in an alternative exemplary embodiment if, for example, each data point of the shapelet is assigned only every second data point of the selected section of the data series.

The measured distances are preferably not negative. A non-negative variable is understood to mean that the value is greater than or equal to 0. This has the advantageous effect that a decision variable must be ascertained within a relatively small range in order to decide whether an anomaly is present in this range. The decision whether an anomaly is present is explained in greater detail in FIG. 3 below. Because of the exclusively positively measured distances, only the range having positive values is required, which is why the decision variable must cover a relatively small range and, as a result, an easier manageability of a method for detecting an anomaly may be achieved.

The ascertainment of the distances may alternatively be carried out in another exemplary embodiment by a convolution between the shapelet and the data series. With the convolution, the distances for each data point of the data series are ascertained. After the convolution, a subset of the measured distances may subsequently be further used.

It is also conceivable for the distances to be ascertained with the aid of the shapelet transformation specifically at particular, predefined positions. Furthermore, other methods for ascertaining the distances are also possible.

Once the distances between the shapelet and the data series have been ascertained with the aid of the shapelet transformation, the smallest distance $M_{i,k}$ of the shapelet transformation for the k-th shapelet to the i-th data series is ascertained:

$$M_{i,k} = \min_{j=1,\ldots,J} D_{i,j,k} \quad \text{(Equation 2)}$$

j corresponding to the number of measured distances.

If the shape of the shapelet is contained in the data series, a value of a measured distance between the shapelet and the data series is small. Thus, the smallest measured distance according to equation 2 characterizes to what extent the shape of the shapelet is contained in the data series. Since the shapelet characterizes a data series that contains no anomalies, it is to be assumed that whenever a smallest measured distance exhibits a small value, the data series contains no anomaly. In another exemplary embodiment, an average distance, for example, instead of the smallest distance, may alternatively be used. It is also conceivable that not the smallest values, but the greatest distances of the shapelet transformation are used.

If multiple different shapelets are used, the shapelet transformation may be carried out for each shapelet. This also applies to a plurality of data series used, a shapelet transformation capable of being carried out for each shapelet to each data series, as a result of which each data series may be checked for an anomaly with each shapelet.

Figure 3:
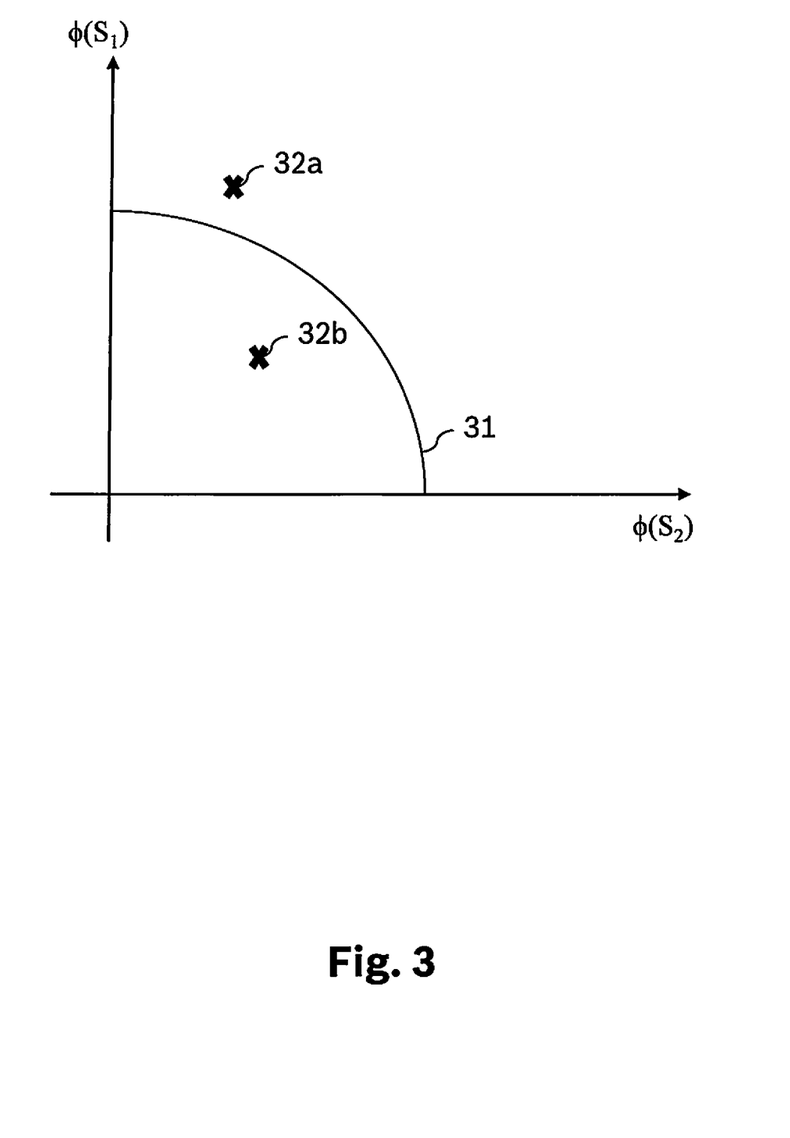
FIG. 3 schematically shows a depiction of a result of a shapelet transformation, which may be used with a decision variable for detecting an anomaly.

FIG. 3 schematically shows a depiction of an exemplary specific embodiment for detecting an anomaly as a function of the result of the shapelet transformation. In this specific embodiment, the result of the shapelet transformations $(\phi(S_1), \phi(S_2))$ is the smallest measured distance 32a, 32b of two shapelets $S_1$, $S_2$ to a data series having an anomaly and to a data series without an anomaly, respectively. The smallest measured distance 32a, 32b may be entered into a coordinate system, each shapelet being assigned one axis each of the coordinate system, on which the result of the shapelet transformation $(\phi(S_1), \phi(S_2))$ of the shapelet with the data series, in particular, the smallest measured distance 32a, 32b, is plotted.

As shown by way of example in FIG. 3, the coordinate system has two axes for two shapelets $S_1$, $S_2$ used, which have been used for the shapelet transformation $(\phi(S_1), \phi(S_2))$. In addition, FIG. 3 shows a decision variable 31. Decision variable 31 may characterize a sector within the coordinate system and is used in order to decide whether an anomaly is present in the data series to be examined if, for example, one of the smallest measured distances 32a is greater than decision variable 31.

The data series contains no anomaly if smallest measured distance 32b is smaller than decision variable 31 or is within the characterizing sector of decision variable 31. If, on the other hand, smallest measured distance 32a is outside the decision variable 31, an anomaly is present in the data series. It should be noted that decision variable 31 used has already been ascertained and is assumed in FIG. 3 as predefined and to be an ideal decision variable. The ascertainment of an optimal decision variable is explained in greater detail below.

The source of the coordinate system is preferably selected as the reference point of decision variable 31. This has the advantageous effect that the result of a shapelet transformation with an ideal shapelet and with a data series with no anomaly lies in the source and, therefore, exhibits a preferably large distance to decision variable 31, since the smallest distance of the shapelet transformation with an ideal shapelet should output the value 0.

Other positions in the coordinate system are also conceivable as reference points, it being noted that the position of the reference point, unlike the source in the following described method, must accordingly also be taken into consideration and/or must also be adapted. Alternatively, the coordinate system in FIG. 3 may also be transformed into a higher-dimensional coordinate system and within this higher-dimensional coordinate system a decision whether an anomaly is present may be carried out with the aid of a decision variable for this higher-dimensional space.

In another exemplary embodiment, decision variable 31 characterizes a hypersphere having an arbitrary shape. Once the smallest measured distance lies outside the hypersphere, it may be assumed that an anomaly is present.

In one alternative exemplary embodiment, in which a plurality of different shapelets are used, an anomaly may be detected, in which either each single ascertained smallest distance of every shapelet is smaller than a predefinable decision variable, or if the sum of the, in particular, weighted, smallest ascertained distances is smaller than decision variable 31.

It is also possible that a center of the hypersphere is positioned in the source. However, the center may alternatively also be situated at an arbitrary position in the space, it also applying here that an anomaly is present in this data series if the entire measured distance is outside the volume of the hypersphere.

The shape of the hypersphere is preferably spherical in higher-dimensional spaces, and circular in two-dimensional spaces and a line in the one-dimensional space. Alternatively, the hypersphere may also assume an arbitrary geometric shape, as a result of which the advantageous effect may be achieved that a more precise and more reliable detection of an anomaly may be carried out.

In another specific embodiment, a tolerance variable, which characterizes a range of a maximum exceedance of the result of the shapelet transformation by decision variable 31, may be defined along decision variable 31. For example, the result, in particular, the smallest measured distance, of the shapelet transformation may be outside decision variable 31, but still within the range defined by the tolerance variable. Because the smallest measured distance in this example is outside decision variable 31, an anomaly may be present, but because the smallest measured distance is within the range of the tolerance variable, it may be decided that no anomaly is present. The tolerance variable therefore has the positive effect that a small decision variable may be selected, but in spite of that, data series with no anomaly having large measured smallest distances are correctly classified. Every shapelet is preferably each assigned a decision variable and a tolerance variable if multiple different shapelets are used.

A transformation of the coordinate system together with entered smallest measured distances may optionally be carried out, as a result of which, for example, redundancies in the measured smallest distances may be removed or a suitable positioning of the smallest measured distances to the hypersphere may be achieved.

Figure 4:
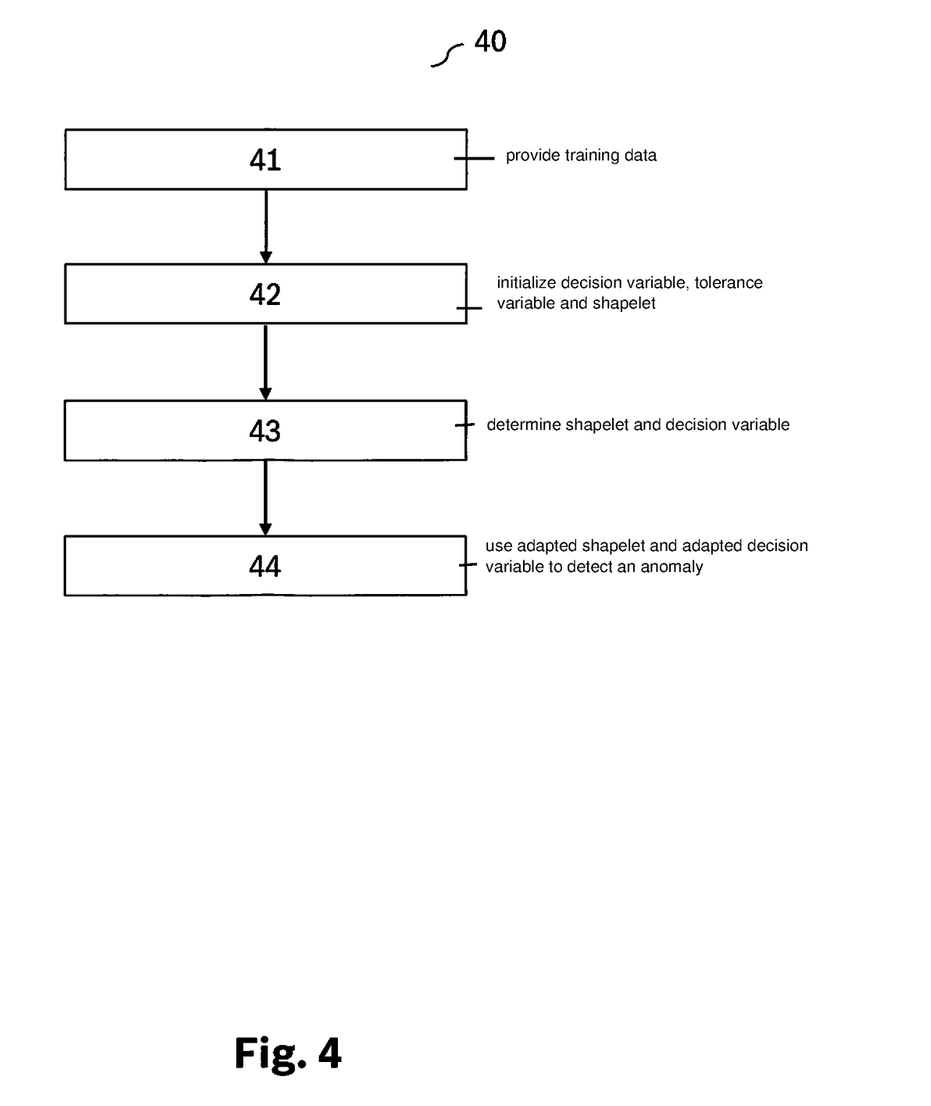
FIG. 4 schematically shows a depiction of one specific embodiment of a method for detecting an anomaly.

FIG. 4 schematically shows a depiction of one specific embodiment of a method 40 for detecting an anomaly in a data series with the aid of a shapelet.

Method 40 starts with step 41. In step 41, a training data series is provided. A plurality of different training data series may optionally also be provided. In one alternative exemplary embodiment, the training data series are not characterized as to whether these contain an anomaly, a certain number of training data series containing at least one anomaly and it not being known which of the training data series contains at least one anomaly.

In subsequent step 42, the variables of method 40 used, in particular, decision variable 31, the tolerance variable and the shapelet are initialized. Alternatively, multiple shapelets may be initialized. The decision variable is preferably selected to be relatively large and the tolerance variable to be initialized proportionately to the selected decision variable. The shapelet is randomly initialized in step 42, i.e., the data points of the shapelet are provided with random values. Alternatively, the values of the shapelet may be initialized as a function of an analysis, in particular, of a cluster analysis, of the values of the data points of the training data series (or series, plural). The analysis may, for example, also be an analysis of the frequency of the different values of the data points of the training date series (or series, plural). In another variation, an arbitrarily selected detail of the data series or an already extracted shapelet may also be used as an initialization of the shapelet. After the initialization of the shapelet, a plurality of distances between the shapelet and the training data series is subsequently measured with the aid of the shapelet transformation, and a smallest distance of the plurality of the measured distances is determined. Alternatively, the initialization of the decision variable may also be carried out once the smallest distance has been ascertained by selecting the decision variable in such a way that this decision variable is greater than the smallest distance. The tolerance variable may optionally also be taken into consideration in this case.

Step 42 is followed by step 43. In step 43, the shapelet and the decision variable are determined, in particular, optimized, so that with the aid of the shapelet, an anomaly in a data series may be detected. Alternatively, the tolerance variable, in addition to the optimization of the shapelet and of the decision variable, may also be optimized in step 43. It is also conceivable for the reference point of decision variable 31 to also be optimized. The optimization in step 43 takes place via an adaptation of the respective variables in such a way that these variables are optimally usable with respect to a detection of an anomaly in a data series, after these have been learned with the training data series at the end of step 43. Alternatively, the optimization of the decision variable and of the shapelet may be carried out simultaneously.

The shapelet is preferably optimized in such a way that the measured distances, in particular, the sum over the measured distances, and of the decision variable and of the tolerance variable, are minimized. Since the decision variable and the tolerance variable are not adapted during the optimization of the shapelet, this means that with the aid of the shapelet transformation, newly measured distances exhibit smaller values at all sections, or at a plurality of the sections used, which have been used for the shapelet transformation whenever the shapelet transformation is carried out anew on the sections having the optimized shapelet.

In another advantageous specific embodiment, the optimization of the shapelet may take place in such a way that after a repeated shapelet transformation on the identical sections of the training data series with the optimized shapelet, the smallest measured distances, measured on the sections with the non-optimized shapelet, exhibit a significantly smaller value in a repeated measurement with the optimized shapelet. The larger measured distances, measured on the sections having the non-optimized shapelet, will also exhibit a smaller value in a repeated measurement with the optimized shapelet, the minimization of these measured values being less pronounced than the minimization of the values of the smaller measured distances. This tendency for the smaller measured distances to be more strongly minimized after the optimization of the shapelet than the larger measured distances stems from the fact that the optimization of the shapelet may also be carried out as a function of the tolerance variable. The tolerance variable is incorporated in the optimization of the shapelet, so that larger measured distances having a higher penalty variable result in higher costs for minimization. The measured distances, which are larger than the decision variable, are associated with higher costs for minimizing each of these distances with the aid of the tolerance variable, as a result of which smaller measured distances are preferred and more significantly minimized. The consideration of the tolerance variable for ascertaining the shapelet has the advantageous effect that still initially large measured distances outside the decision variable, are also included within the decision variable and may thus also be minimized.

The optimization in step 43 in this specific embodiment may, for example, be carried out as a function of the following equation, which may be considered as a cost function to be minimized:

$$\operatorname*{argmin}_{R,S,\xi} F(R, S) = R^2 + C\sum_{i=1}^{N} \xi_i + \sum_{i=1}^{N} l(x_i) \qquad \text{(Equation 3)}$$

in which C=1(N*α) with N*α data series, which include an anomaly and it is not known which of the data series includes an anomaly and with the number N of the different data series, the relative number α of the data series having an anomaly, the tolerance variable ξ and a regularization $l(x_i)$, when K different shapelets are adapted:

$$l(x_i)=\|x_i\|^2=\Sigma_{k=1}^{K} M_{i,k}^2 \qquad \text{(Equation 4):}$$

After the equation (equation 3) to be optimized has been postulated and the individual variables, in particular, the smallest measured distances, have been ascertained within this equation, the decision variable and the values of the data point of the shapelet are adapted, in particular, optimized, in two steps as a function of the cost function (Equation 3). The two steps for adapting the shapelet and the decision variable may optionally be repeated alternatingly multiple times in succession. This has the advantageous effect that the shapelet is newly optimized repeatedly for the adapted decision variable, as a result of which a more rapid convergence to an ideal shapelet may be achieved.

The first step includes an adaptation of the decision variable with the aid of equation 3, in which the decision variable is optimized and the shapelet remains unchanged. The optimization of the decision variable takes place in such a way that equation 3 becomes minimal for a given shapelet while adapting the decision variable. An optimal decision variable may be ascertained using standard methods of linear programming, for example, using "Lagrangian multipliers". In an alternative use of a hypersphere as a decision variable, the parameters in this case, which characterize the hypersphere, must then be adapted.

Once the decision variable has been adapted, this is followed by the adaptation of the shapelet.

In order to optimize the data points of the shapelet, the cost function (equation 3) for the newly adapted decision variable must be minimized. Cost function (equation 3) is minimized by a suitable adaptation of one of the values or of multiple values of the data points of the shapelet. A gradient descent method is preferably applied in order to find a global minimum of the cost function (equation 3). An ascertained gradient, which is determined with the aid of the gradient descent method, may be used in order to adapt at least one value of one of the data points of the shapelet.

Since the decision variable remains unchanged and only the shapelet is optimized, the cost function (equation 3) may optionally be simplified. In this exemplary embodiment, the simplified cost function (equation 3) may appear as follows:

$$\underset{S}{\arg\min}\, F(R, S) = R^2 + C \sum_{i=1} \max\{0, \|x_i\|^2 - R^2\} + \sum_{i=1} l(x_i) \quad \text{(Equation 5)}$$

The conversion of the tolerance variable into the $\max\{\cdot\}$ term means that results of the shapelet transformation may also be used for optimizing the shapelet, which are less suitable during the shapelet transformation of different shapelets and/or at different positions of the training data series, but are weighted higher with the aid of this term and are therefore associated with higher costs in order to include this point within the decision variable during optimization of the shapelet and therefore may be taken into consideration in the optimization of the shapelet.

In order to optimize the data points of the shapelet, equation 5 may be minimized as a function of the data points of the shapelet. For this purpose, the following approximation of the gradient for a gradient descent method may be applied, for example:

$$\frac{d\, F_i(R, S)}{dS_{k,l}} = C \frac{d}{dS_{k,l}} \max\{0, \|x_i\|^2 - R^2\} + \frac{d}{dS_{k,l}} \|x_i\|^2 \quad \text{(Equation 6)}$$

It should be noted that equation 6 has been postulated for the i-th data series of a plurality of data series.

Using a subgradient, the derivation according to equation 6 may be pieced together as in the following.

The first term from equation 6 may include the following subgradient shape:

$$C \frac{d}{dS_{k,l}} \max\{0, \|x_i\|^2 - R^2\} \approx \quad \text{(Equation 7)}$$

$$\delta(\|x_i\|^2 - R^2) \cdot 2C \cdot \tilde{M}_{i,k} \cdot (1 - \delta(\|x_i\|^2 = R^2) \cdot u[0, 1]) \cdot$$

$$\sum_j \frac{d\tilde{M}_{i,k}}{dD_{i,k,j}} \frac{dD_{i,k,j}}{dS_{k,l}}$$

$\tilde{M}_{i,k}$ being a predefinable weighted summation of the measured distances from the shapelet transformation of the k-th shapelet to the i-th data series. $\tilde{M}_{i,k}$ is optionally also standardized and the weighting of the measured distances $D_{i,k,j}$ takes place with $e^{WD_{i,k,j}}$, w being a weighting constant. Alternatively, the standardization of $\tilde{M}_{i,k}$ may be standardized with the aid of a division of $\tilde{M}_{i,k}$ by the sum of the weights used. u[0,1] is a probability density function, in particular, an equal distribution. Other probability density functions are also conceivable such as, for example, a Gaussian distribution. $\delta(\cdot)$ is a jump function ("Heaviside Function").

The second term of equation 6 may have the following gradient shape:

$$\frac{d}{dS_{k,l}} \|x_i\|^2 \approx 2\, \tilde{M}_{i,k} \sum_j \frac{d\tilde{M}_{i,k}}{dD_{i,k,j}} \frac{dD_{i,k,j}}{dS_{k,l}} \quad \text{Equation 8)}$$

With equation 7 and equation 8, it is possible to minimize equation 5 using the gradient descent method. In such case, the change variable may then be composed of the sum of the subgradient according to equation 8 and of the gradient according to equation 8. It is noted that equation 7 and equation 8 apply to one training data series each. Whenever multiple different training data series are used, a change variable may be ascertained for each training data series, the adaptation of the shapelet being capable of being carried out as a function of an averaging of the ascertained change variables, which has the advantageous effect that this is less processor-intensive than a minimization of the cost function with a superposition of all training data series.

A change variable for the data points of the shapelet may be ascertained with the aid of equation 6. The values of the data points of the shapelet are adapted as a function of the ascertained change variable. The change variable is preferably the gradient and the data points are adapted as a function of a weighting of the change variable with a learning rate, this weighting being subtracted from the instantaneous value of the data point.

It is also possible for multiple different shapelets to be used. For this purpose, the optimization for each shapelet may be carried out separately according to one of the aforementioned equations. In addition, multiple different training data series may also be used. Whenever multiple different training data series are used, an optimization of each shapelet is carried out for each training data series. For each shapelet and for each data series, one change variable each for the respective shapelet is ascertained for this purpose. Once the change variables have been ascertained, an averaging of the change variable, for example, for every shapelet is ascertained and the respective shapelet is adapted as a function of the averaged change variable.

If the optimization of the shapelet and of the decision variable is repeated multiple times in succession, these steps are repeated preferably multiple times until the ascertained change variable of at least one data point of the shapelet is smaller than 0.0001. Alternatively, another stop criterion may also be used.

In another exemplary embodiment, the method for ascertaining a shapelet using multiple differently initialized shapelets is carried out multiple times and the newly adapted shapelets that may best be used for detecting an anomaly are tracked and further used or used directly as a shapelet for detection. The step of ascertaining a change variable and of adapting the shapelet is preferably carried out ten times in succession and the most suitable shapelets from the differently initialized and subsequently adapted shapelets are further used. Alternatively, the method may be carried out multiple times for the same shapelet with different initializations by alternating adaptation of the decision variable and subsequent adaptation of the shapelet. The shapelets used are then preferably those, which generate a small distance to normal data series and therefore are suitable as representatives for normal data series.

Step 44 follows, once step 43 has been completed. In step 44, the adapted shapelet and the adapted decision variable are used to detect an anomaly in a registered data series, which has been registered for example, with the aid of registration unit 11. In the process, a plurality of distances may be measured with the aid of a shapelet transformation using the ascertained shapelet and the smallest measured distance ascertained therefrom. When checking whether an anomaly is present in the registered data series, the smallest measured distance is compared with the decision variable, see FIG. 3.

Optionally, a control variable may be ascertained as a function of the detected anomalies in order to control an actuator 16 with the aid of control unit 13 as a function of the control variable.

In one alternative specific embodiment, step 43 of method 40 may be cyclically repeated until a predefined stop criterion is met. It is also conceivable for method 40 to start with step 42 cyclically after the end of step 43 if, for example, additional training data are available and/or it has been ascertained that not yet reliable anomalies may be detected with the aid of the adapted shapelet.

In one preferred exemplary embodiment for optimizing the shapelet, a is selected between 0.1% and 5% and the number of shapelets is selected in relation to the length of the data series or the training data series to be examined, the number of the shapelets being between 1% and 10% of the length of the data series. The length of the shapelets used in relation to the length of the data series is selected in this preferred exemplary embodiment between 5% and 30% of the length of the data series.

What is claimed is:

1. A computer-implemented method for ascertaining whether a series of sensor values contains an anomaly, comprising the following steps:
providing, by a computer, a shapelet and at least one training data series;
measuring, by the computer, in each case a distance between the shapelet and the training data series at a plurality of different predefined positions of the training data series;
ascertaining, by the computer, at least one minimal distance from the measured distances; and
ascertaining, by the computer, at least one change variable for at least one predefinable data point of the shapelet, the change variable being ascertained as a function of at least one of the measured distances;
wherein the ascertainment of the minimum distance is followed by an ascertainment of a decision variable in such a way that the minimum distance is smaller than the decision variable plus a predefinable tolerance variable; and wherein the change variable is also ascertained as a function of the decision variable and of the predefinable tolerance variable; and
wherein the method further comprises:
deciding, by the computer, as a function of the decision variable, whether or not an anomaly is present in the series of sensor values.

2. The method as recited in claim 1, wherein the change variable is ascertained with the aid of a gradient descent method with respect to the predefinable data point of the shapelet.

3. The method as recited in claim 2, wherein the change variable is ascertained as a function of at least one gradient of the gradient descent method, and a cost function is minimized as a function of the change variable with the aid of an adaptation of the predefinable data point of the shapelet.

4. The method as recited in claim 3, wherein at least the gradient and at least one subgradient are ascertained with the aid of the gradient descent method, the gradient being ascertained as a function of at least one of the measured distances used for ascertaining the change variable, the subgradient being ascertained as a function of the tolerance variable, and the change variable also being ascertained as a function of at least the ascertained subgradient or subgradients.

5. The method as recited in claim 3, wherein the change variable is ascertained as a function of a weighted summation of a plurality of the measured distances.

6. The method as recited in claim 5, wherein the gradient and the subgradient are each ascertained as a function of the weighted summed distances.

7. The method as recited in claim 3, wherein a plurality of different training data series is provided, when measuring the distances, in each case, a plurality of distances between the shapelet to one each of the training data series at different predefinable points of the respective training data series being measured, and in each case, at least one minimal distance of the plurality of measured distances of every training data series being ascertained, the decision variable being adapted in such a way that the respectively ascertained minimum distances are smaller than the decision variable plus the tolerance variable, in each case, at least one change variable being ascertained for at least one predefinable data point of the shapelet for each of the training data series, and the predefinable data point of the shapelet being adapted as a function of an averaging of the ascertained change variables.

8. The method as recited in claim 7, wherein the subgradient is ascertained only as a function of those minimal distances that are greater than the decision variable.

9. The method as recited in claim 1, wherein the minimum distance, if it is greater than the decision variable, is taken into consideration as a penalty variable in the tolerance variable, the penalty variable being a function of the exceedance of the minimum distance beyond the decision variable.

10. The method as recited in claim 1, wherein after ascertainment of the change variable, the predefinable data point of the shapelet is adapted as a function of the change variable, the steps of measuring a plurality of distances and of adapting the decision variable and of ascertaining at least one adaptation variable and the step of adapting the predefinable data point of the shapelet are carried out multiple times in succession, and wherein the step of measuring a plurality of distances is carried out in each case with the aid of the adapted shapelet, which has been adapted in the step of adapting the data point of the shapelet as a function of the change variable.

11. The method as recited in claim 1, wherein when adapting the decision variable, in addition, the tolerance variable is also adapted.

12. The method as recited in claim 1, further comprising:
controlling an actuator as a function of the decision of whether or not the anomaly is present.

13. The method as recited in claim 12, wherein the actuator is part of an at least semi-autonomous machine, and wherein the controlling includes controlling the actuator, in response to deciding that the anomaly is present, to output a visual signal and/or an acoustic signal and/or a haptic signal.

14. The method as recited in claim 13, where the actuator is a warning system, and the at least semi-autonomous machine is a robot or a vehicle.

15. The method as recited in claim 13, wherein the controlling includes controlling the actuator, in response to deciding that the anomaly is present, to start a protection function, the protection function including an emergency shutdown or a regulation of torque.

16. The method as recited in claim 12, wherein the actuator is in a motor vehicle, and the controlling includes transferring, in response to deciding that the anomaly is present, a control system of the motor vehicle into a secured mode.

17. The method as recited in claim 12, wherein the actuator is part of an at least semi-autonomous machine, and wherein the controlling includes controlling the actuator, in response to deciding that the anomaly is present, to trigger or carry out an action of the at least semi-autonomous machine.

18. A non-transitory machine-readable memory element on is stored a computer program for ascertaining whether a series of sensor values contains an anomaly, the computer program, when executed by a computer, causing the computer to perform:

provinding, by the computer, a shapelet and at least one training data series;

measuring, by the computer, in each case a distance between the shapelet and the training data series at a plurality of different predefined positions of the training data series;

ascertaining, by the computer, at least one minimal distance from the measured distances; and ascertaining, by the computer, at least one change variable for at least one predefinable data point of the shapelet, the change variable being ascertained as a function of at least one of the measured distances;

wherein the ascertainment of the minimum distance is followed by an ascertainment of a decision variable in such a way that the minimum distance is smaller than the decision variable plus a predefinable tolerance variable; and wherein the change variable is also ascertained as a function of the decision variable and of the predefinable tolerance variable; and wherein the computer program, when executed by the computer, further causes the computer to perform:

deciding, by the computer, as a function of the decision variable, whether or not an anomaly is present in the series of sensor values.

19. The non-transitory machine-readable memory element as recited in claim 18, wherein the computer program further causes the computer to perform:

controlling an actuator as a function of the decision of whether or not the anomaly is present.

20. A device for ascertaining whether a series of sensor values contains an anomaly, the device configured to:

provide, by a computer, a shapelet and at least one training data series;

measure, by the computer, in each case a distance between the shapelet and the training data series at a plurality of different predefined positions of the training data series;

ascertain, by the computer, at least one minimal distance from the measured distances; and ascertain, by the computer, at least one change variable for at least one predefinable data point of the shapelet, the change variable being ascertained as a function of at least one of the measured distances;

wherein the ascertainment of the minimum distance is followed by an ascertainment of a decision variable in such a way that the minimum distance is smaller than the decision variable plus a predefinable tolerance variable; and wherein the change variable is also ascertained as a function of the decision variable and of the predefinable tolerance variable; and wherein the device is further configured to:

decide, by the computer, as a function of the decision variable, whether or not an anomaly is present in the series of sensor values.

21. The device as recited in claim 20, wherein the device is further configured to:

control an actuator as a function of the decision of whether or not the anomaly is present.

\* \* \* \* \*